United States Patent
Okuda (10) Patent No.: US 9,895,904 B2
(45) Date of Patent: Feb. 20, 2018

(54) RECORDING METHOD

(71) Applicant: Seiko Epson Corporation, Tokyo (JP)

(72) Inventor: Ippei Okuda, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/431,924

(22) Filed: Feb. 14, 2017

(65) Prior Publication Data

US 2017/0232763 A1    Aug. 17, 2017

(30) Foreign Application Priority Data

Feb. 17, 2016    (JP) .................................. 2016-027784

(51) Int. Cl.

| | |
|---|---|
| *B41J 11/00* | (2006.01) |
| *B41J 2/01* | (2006.01) |
| *C09D 11/36* | (2014.01) |
| *C09D 11/38* | (2014.01) |
| *C09D 11/322* | (2014.01) |
| *C09D 11/108* | (2014.01) |
| *C09D 11/104* | (2014.01) |
| *C09D 11/107* | (2014.01) |

(52) U.S. Cl.
CPC ......... *B41J 11/0015* (2013.01); *C09D 11/104* (2013.01); *C09D 11/107* (2013.01); *C09D 11/108* (2013.01); *C09D 11/322* (2013.01); *C09D 11/36* (2013.01); *C09D 11/38* (2013.01)

(58) Field of Classification Search
CPC ....... B41J 11/0015; B41J 2/01; C09D 11/107; C09D 11/104; C09D 11/108; C09D 11/38; C09D 11/36; C09D 11/322
See application file for complete search history.

(56) References Cited

U.S. PATENT DOCUMENTS

2012/0188305 A1\*    7/2012    Shiono ................. B41M 5/0023
                                                                        347/20

FOREIGN PATENT DOCUMENTS

| JP | 2002-103783 A | 4/2002 |
|---|---|---|
| JP | 2012-149184 A | 8/2012 |

\* cited by examiner

*Primary Examiner* — Bradley Thies
(74) *Attorney, Agent, or Firm* — Harness, Dickey & Pierce, P.L.C.

(57) ABSTRACT

A recording method includes applying a white ink containing a white material and a first resin onto a predetermined region of a recording medium, and applying a reaction liquid containing a reaction agent onto at least the predetermined region. Further, the recording method includes applying a clear ink containing a second resin onto at least the predetermined region, and the application of the white ink and the clear ink are performed while the white ink and the clear ink are both wet; and/or the white ink further contains the second resin. When either the first resin and water, or the second resin and water, is mixed with an aqueous solution of magnesium sulfate, the average particle size of the first resin increases more than the second resin.

9 Claims, 1 Drawing Sheet

RECORDING METHOD

BACKGROUND

1. Technical Field

The present invention relates to a recording method.

2. Related Art

An ink jet recording method allows a relatively simple apparatus to form high-definition images and is being rapidly developed in various fields. A variety of research on this method has been conducted from the viewpoint of producing high-quality recorded articles and the like. For example, JP-A-2002-103783 discloses an ink jet recording aqueous ink set and an ink jet recording method for forming white images. The ink jet recording aqueous ink set enables printing without clogging of ink ejection nozzles, exhibits good ejection stability and good ejection response, achieves high quality printing with a high print density and also a high opacity even on a transparent film, and exhibits good stability in long-time storage. In the ink jet recording method, in which ink is ejected onto a recording medium to perform recording, an ink composition containing at least a colloidal inorganic oxide is brought into contact with a reaction liquid on a transparent recording medium to form a white or a light-absorbing image. The reaction liquid contains at least a reaction agent that aggregates the colloidal particles of the inorganic oxide when mixed with the ink composition.

Unfortunately, when the white ink is used for recording on the recording medium in combination with the reaction liquid, the resulting recorded article often exhibits low image quality, a low L* value, or poor opacity, or the amount of the white ink to be ejected to a unit area is limited.

SUMMARY

An advantage of some aspects of the invention is that it provides a recoding method that can produce a recorded article having high image quality, a high L* value, and good opacity.

The present inventors have conducted intensive research to solve the above issue and found that the issues can be solved by a recording method according to an embodiment of an idea.

The recording method includes applying a white ink composition containing a white coloring material and a first resin onto at least a predetermined region of a recording medium, and applying a reaction liquid containing a reaction agent onto at least the predetermined region of the recording medium. The reaction agent increases the viscosity of the white ink composition or aggregates the constituent particles in the white ink composition. In addition, the recording method satisfies at least one of the following (i) and (ii): (i) the recording method further includes applying a clear ink composition containing a second resin onto at least the predetermined region of the recording medium, and the application of the white ink composition and the application of the clear ink composition are performed in a state where both the white ink composition and the clear ink composition are wet; and (ii) the white ink composition further contains the second resin. For the first and the second resin, when each of a liquid of the first resin in water and a liquid of the second resin in water is mixed with an aqueous solution of magnesium sulfate, the magnitude of increase in average particle size of the first resin is larger than the magnitude of increase in average particle size of the second resin.

The magnitude of increase in average particle size of the first resin may be 3 times or more, and the magnitude of increase in average particle size of the second resin may be less than 3 times.

Preferably, the first resin and the second resin are each resin fine particles.

Preferably, the ink compositions satisfy one of the following: the white ink composition contains both the first resin and the second resin, and the ratio of the first resin content to the second resin content is in the range of 5:1 to 1:5 on a mass basis; and the ratio of the first resin content in the white ink composition to the second resin content in the clear ink composition is in the range of 5:1 to 1:5 on a mass basis.

The clear ink composition may be applied onto the predetermined region of the recording medium at a rate of 0.5 mg/inch$^2$ to 5 mg/inch$^2$.

Preferably, the white coloring material has an average particle size of 200 nm to 400 nm.

The white ink composition may be applied onto the predetermined region of the recording medium at a rate of 10 mg/inch$^2$ to 15 mg/inch$^2$.

Preferably, the white ink composition is applied onto the recording medium having a surface temperature of 45° C. or less.

The recording medium may be transparent.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention (hereinafter, referred to "embodiments") will now be described in detail with reference to the drawings as needed. However, the invention is not limited to the disclosed embodiments, and various modifications may be made without departing from the scope and spirit of the invention. The same elements in the drawings are designated by the same reference numerals, and thus description thereof is omitted. The relative positions and other positional relationship accord with the drawings unless otherwise specified. The dimensional proportions in the drawings are not limited to those shown in the drawings.

Recording Method

The recording method according to an embodiment includes applying a white ink composition containing a white coloring material and a first resin onto at least a predetermined region of a recording medium, and applying a reaction liquid containing a reaction agent onto at least the predetermined region of the recording medium. The reaction agent increases the viscosity of the white ink composition or aggregates constituent particles in the white ink composition. In addition, the recording method satisfies at least one of the following (i) and (ii): (i) the recording method further includes applying a clear ink composition containing a second resin onto at least the predetermined region of the recording medium, and the application of the white ink composition and the application of the clear ink composition are performed in a state where both the white ink composition and the clear ink composition are wet; and (ii) the white ink composition further contains the second resin. For the first and the second resin, when each of a liquid of the first resin in water and a liquid of the second resin in water is mixed with an aqueous solution of magnesium sulfate, the magnitude of increase in average particle size of the first resin is larger than the magnitude of increase in average particle size of the second resin.

Figure 1:
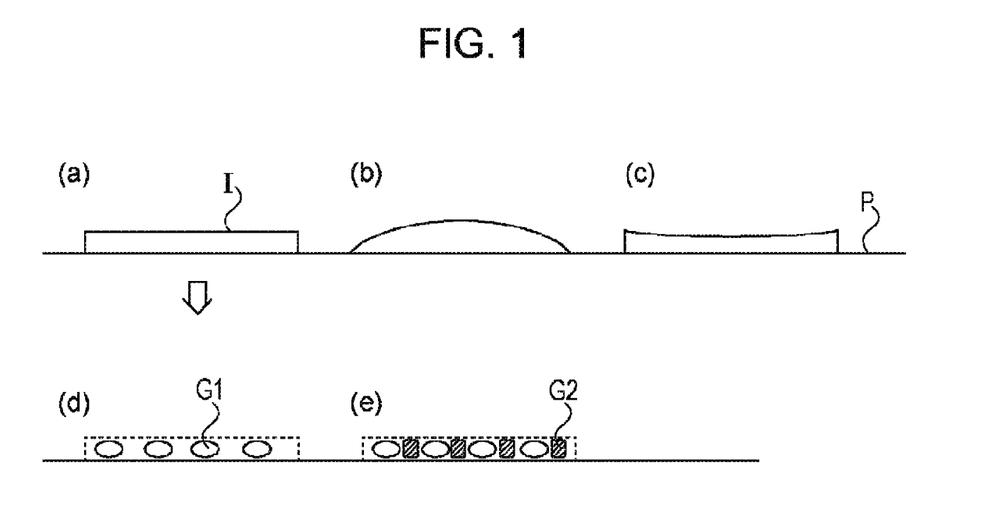
FIG. 1 is a schematic representation of states of an ink composition on a recording medium.

FIG. 1 is a schematic representation of states of an ink composition on a recording medium. As shown in (a) of FIG. 1, the flatter the surface I of the ink composition on a recording medium P, the higher the perceived lightness L* of the surface; and the more uniform the coating of the ink composition, the higher the opacity. Also, the less the ink composition spreads to (bleed into) the outside of the region onto which the ink composition has been ejected, the more the ink composition can be applied to the recording medium.

In general, when a white ink composition is used for recording in combination with a reaction liquid, the resulting recorded article on the recording medium often exhibits a low L* value, or poor opacity, or the amount of the white ink composition to be ejected to a unit area is limited. This is because of the following reasons: the ink composition spreads to the outside of the region on which it has landed, as shown in (b) of FIG. 1, in practice; what is called a coffee stain occurs as shown in (c) of FIG. 1, and the coffee stain causes the ink coating film to have a nonuniform surface, resulting in a reduced L* value or reduced opacity; and if the amount of the ink composition applied is increased from the viewpoint of ensuring a sufficient L* value and opacity, image quality is reduced.

In addition, in the case of the recording method in which the reaction liquid aggregates the constituent particles of the ink composition, the aggregates of the resin particles and coloring material particles (constituent aggregates G1 in the ink composition) are locally present as shown in (d) of FIG. 1 in practice. This further reduces the L* value and opacity.

In the case of the recording method of the embodiments, on the other hand, non-aggregated resin G2 (second resin) forms a leveling coating film to fill the gaps between the aggregates of the resin particles and coloring material particles and cover the surfaces of the aggregates, thus increasing the L* value and opacity of the resulting recorded article. Also, the amount of the ink composition to be ejection to a unit area can be increased, and thus image formability can be improved.

Application of White Ink Composition

In the step of applying a white ink composition, a white ink composition containing a white coloring material is applied onto at least a predetermined region (hereinafter, referred simply to "the predetermined region") of a recording medium. For applying the white ink composition, an ink jet method may be used, but the application method is not limited to this.

The white ink composition may be applied to the predetermined region of the recording medium at a rate of 5 mg/inch$^2$ to 20 mg/inch$^2$, preferably 5 mg/inch$^2$ to 15 mg/inch$^2$, more preferably 10 mg/inch$^2$ to 15 mg/inch$^2$. When the white ink composition is applied at such a rate, the L* value and opacity of the resulting recorded article tend to be further increased.

The surface temperature of the recording medium when the white ink composition is applied is preferably 45° C. or less, more preferably 10° C. to 40° C., still more preferably 10° C. to 38° C., and further preferably 15° C. to 35° C. When the surface temperature of the recording medium is in such a range, clogging tends to be less likely to occur. For raising the surface temperature from room temperature, heat may be applied to the recording medium.

White Ink Composition

The white ink composition contains a white coloring material and a first resin, and optionally a second resin, and may optionally contain other ingredients.

White Coloring Material

Examples of the white coloring material include, but are not limited to, C. I. Pigment Whites 6, 18, and 21, titanium dioxide, zinc oxide, zinc sulfide, antimony oxide, zirconium oxide, and white hollow resin or polymer particles. Among these, titanium dioxide is more advantageous.

Preferably, the white coloring material has an average particle size of 150 nm to 450 nm, more preferably 200 nm to 400 nm, still more preferably 250 nm to 350 nm. When a white coloring material having such an average particle size is used, the L* value and opacity of the resulting recorded article tend to be further increased, and clogging tends to be less likely to occur. The average particle size of the white coloring material can be measured by a dynamic light scattering method.

The white coloring material content in the white ink composition is preferably 2.5% to 17.5% by mass, more preferably 5% to 15% by mass, and still more preferably 7.5% to 12.5% by mass, relative to the total mass of the white ink composition. When the white coloring material content is in such a range, the L* value and opacity of the resulting recorded article tend to be further increased, and clogging tends to be less likely to occur.

First Resin

When a liquid of the first resin in water is mixed with an aqueous solution of magnesium sulfate, the average particle size of the first resin increases. The magnitude of increase in average particle size of the first resin is larger than that of the second resin. Specifically, when 0.27 M aqueous solution of magnesium sulfate is mixed with each of 5% by mass liquid of the first resin in water and 5% by mass liquid of the second resin in water in a mass ratio of 1:10, the magnitude of increase in average particle size of the first resin is larger than that of the second resin.

The magnitude of increase of the first resin may be measured by the following procedure. Five percent by mass liquid of the first resin in water is first prepared, and the average particle size of the first resin in this liquid is measured by a light scattering method. Subsequently, 0.27 M aqueous solution of magnesium sulfate and 5% by mass liquid of the first resin in water are mixed with a mass ratio of 1:10, and the average particle size of the first resin in the mixture is measured by the light scattering method. The magnitude of increase in average particle size is defined by the proportion of the average particle size of the first resin after mixing the liquid and the aqueous solution to the average particle size of the first resin before the mixing.

The magnitude of increase in average particle size of the first resin is preferably 3 times or more, more preferably 5 times or more, and still more preferably 10 times or more. When the average particle size of the first resin increases at such a magnitude, the image quality, L* value, and opacity of the resulting recorded article tend to be further increased. The upper limit of the magnitude of increase in average particle size of the first resin may be, but is not limited to, 1000 times, preferably 100 times, still more preferably 40 times, further preferably 30 times.

Examples of the first resin include, but are not limited to, polyester-based resin, polyethylene-based resin, acrylic resin, styrene acrylic resin, fluorene-based resin, urethane-based resin, polyolefin-based resin, rosin-modified resin, terpene-based resin, polyamide-based resin, epoxy resin, vinyl chloride-based resin, vinyl chloride-vinyl acetate copolymer, and ethylene vinyl acetate resin. Urethane-based resin, acrylic resin, polyester-based resin, and polyethylene-based resin are preferable, and polyester-based resin and polyethylene-based resin are more preferable. The first resin may be a single resin or a mixture of two or more resins. The first resin may be soluble in water, or may be present in a state of fine particles in water. Preferably, the first resin is in a state of fine particles. Preferably, the resin fine particles are in a resin emulsion.

The use of the first resin in such a state enables the method of the present embodiment to be more advantageous. In the present embodiment, the acrylic resin may be a polymer containing a (meth)acrylic monomer, such as a (meth)acrylic acid or a (meth)acrylic acid ester, with a content of 10% by mass or more, preferably 40% by mass or more, relative to the total mass of the monomers used for polymerization. Other monomers, such as styrene and other vinyl monomers, may be additionally used for the polymerization of the acrylic resin. For example, an acrylic resin polymerized by additionally using styrene, that is, a styrene-acrylic resin, is advantageous.

From the viewpoint of controlling the magnitude of increase in average particle size of the first resin in the above-mentioned range, the first resin may be, but is not limited to, self-dispersible resin fine particles. Also, the first resin may have an acid value (measured by potentiometry in accordance with JIS K2501) of 5 mg KOH/g or more, preferably 10 mg KOH/g or more. The first resin may be anionic.

The first resin content in the white ink composition is preferably 0.5% to 10% by mass, more preferably 1% to 7.5% by mass, and still more preferably 2.5% to 5% by mass, relative to the total mass of the white ink composition. When the first resin content is in such a range, the image quality, L* value and opacity of the resulting recorded article tend to be further increased.

Second Resin

When a liquid of the second resin in water is mixed with an aqueous solution of magnesium sulfate, the average particle size of the second resin increases. The magnitude of increase in average particle size of the second resin is smaller than that of the first resin. Specifically, when 0.27 M aqueous solution of magnesium sulfate is mixed with each of 5% by mass liquid of the first resin in water and 5% by mass liquid of the second resin in water in a mass ratio of 1:10, the magnitude of increase in average particle size of the second resin is smaller than that of the first resin.

The magnitude of increase of the second resin may be measured by the following procedure. Five percent by mass liquid of the second resin in water is first prepared, and the average particle size of the second resin in this liquid is measured by a light scattering method. Subsequently, 0.27 M aqueous solution of magnesium sulfate and 5% by mass liquid of the second resin in water are mixed with a mass ratio of 1:10, and the average particle size of the second resin in the mixture is measured by the light scattering method. The magnitude of increase in average particle size is defined by the proportion of the average particle size of the second resin after mixing the liquid and the aqueous solution to the average particle size of the second resin before the mixing.

The magnitude of increase in average particle size of the second resin is preferably less than 3 times, more preferably 2.75 times or less, still more preferably 2.5 times or less, and further preferably 2.0 times or less. However, the magnitude of increase is not numerically limited as long as the magnitude of increase in average particle size of the second resin is smaller than that of the first resin. For example, when the magnitude of increase of the first resin is 10 times or more, the magnitude of increase of the second resin may be 5 times or less. When the average particle size of the second resin increases at such a magnitude, the image quality, L* value and opacity of the resulting recorded article tend to be further increased. Preferably, the difference in magnitude of increase between the first resin and the second resin is 1 time or more, preferably 2 times or more, still more preferably 7 times or more, further preferably 10 times or more, from the viewpoint of increasing the image quality, L* value and opacity of the resulting recorded article.

A resin of the same type as the first resin may be used as the second resin independently of the first resin. Examples of the second resin include, but are not limited to, polyester-based resin, polyethylene-based resin, acrylic resin, styrene acrylic resin, fluorene-based resin, urethane-based resin, polyolefin-based resin, rosin-modified resin, terpene-based resin, polyamide-based resin, epoxy resin, vinyl chloride-based resin, vinyl chloride-vinyl acetate copolymer, and ethylene vinyl acetate resin. Polyester-based resin and polyethylene-based resin are preferable. The second resin may be a single resin or a mixture of two or more resins. The second resin may be soluble in water, or may be present in a state of fine particles in water. Preferably, the second resin is in a state of fine particles. The use of the second resin in such a state enables the method of the present embodiment to be more advantageous.

The first resin, of which the magnitude of increase in average particle size is relatively larger, may be self-dispersible resin fine particles that are likely to be aggregated by a reaction agent, and the second resin, of which the magnitude of increase in average particle size is relatively small, may be emulsifier-dispersible resin fine particles that are not likely to be aggregated by the reaction agent. The first resin may be a resin having an acid value (measured by potentiometry in accordance with JIS K2501) of 10 mg KOH/g or more, and the second resin may be a resin having an acid value of less than 10 mg KOH/g. Alternatively, an anionic resin liquid may be used as the first resin, and a nonionic or cationic resin liquid may be used as the second resin.

The second resin content is preferably 0.1% to 10% by mass, more preferably 0.5% to 7.5% by mass, and still more preferably 1% to 5% by mass, relative to the mass of the white ink composition. When the second resin content is in such a range, the image quality, L* value and opacity of the resulting recorded article tend to be further increased.

If the white ink composition contains both the first resin and the second resin, the ratio of the first resin content to the second resin content in the white ink composition is preferably 5:1 to 1:5, more preferably 3:2 to 1:4, and still more preferably 3:2 to 2:3. When the ratio of the first resin content to the second resin content is in such a range, the image quality, L* value and opacity of the resulting recorded article tend to be further increased.

From the viewpoint of controlling the magnitude of increase in average particle size of the second resin in the above-mentioned range, the second resin may be, but is not limited to, emulsifier-dispersible resin fine particles. Also, the second resin may have an acid value of less than 5 mg KOH/g. The second resin may be nonionic or cationic. Resins each prepared as the first resin or the second resin are measured for the magnitude of increase in average particle size, and resins satisfying the requirement of the magnitude of increase are selected for use as the first resin and the second resin.

Solvent

The white ink composition may contain a solvent. The solvent may be, but is not limited to, an organic solvent or water.

The water may be pure water or ultra pure water from which ionic impurities have been removed as much as possible. Examples of such water include ion exchanged water, ultrafiltered water, reverse osmosis water, and distilled water.

Preferably, the water content in the white ink composition is 40% to 80% by mass, preferably 50% to 70% by mass, relative to the total mass of the white ink composition.

Examples of the organic solvent include, but is not limited, hydrocarbons, such as toluene, hexane, cyclohexane, benzene, octane, and isooctane; esters, such as ethyl acetate, butyl acetate, and γ-butyrolactone; ketones, such as acetone, methyl ethyl ketone, methyl isobutyl ketone, and cyclohexanone; alcohols, such as methanol, ethanol, propanol, isopropanol, and butanol; halogen-containing solvents, such as dichloroethane and chloroform; ethers, such as diethyl ether and tetrahydrofuran; amides, such as N,N-dimethylformamide, N,N-dimethylacetamide, N-methyl-2-pyrrolidone, N-ethyl-2-pyrrolidone, 2-pyrrolidone, N-methyl-ε-caprolactam, and hexamethylphosphoramide; and water-soluble organic solvents, such as 1,2-pentanediol, dipropylene glycol, glycerin, triethylene glycol, and triethylene glycol monobutyl ether. Among these, water-soluble organic solvents such as 1,2-pentanediol and dipropylene glycol are more advantageous.

Preferably, the organic solvent content in the white ink composition is 15% to 35% by mass, preferably 20% to 30% by mass, relative to the total mass of the white ink composition.

Surfactant

The white ink composition may contain a surfactant. The surfactant may be, but is not limited to, an acetylene glycol-based surfactant, a fluorosurfactant, or a silicone surfactant.

The acetylene glycol-based surfactant may be, but is not limited to, at least one selected from the group consisting of 2,4,7,9-tetramethyl-5-decyne-4,7-diol and alkylene oxide adducts thereof and 2,4-dimethyl-5-decyne-4-ol and alkylene oxide adducts thereof. The acetylene glycol-based surfactant is commercially available, and examples of the commercially available acetylene glycol-based surfactant include, but are not limited to, Olfine 104 series and Olfine E series, such as Olfine E1010, (each a product of Air Products Japan Inc.); and Surfynol series 104, 465, and 61 (each a product of Nissin Chemical Industry Co., Ltd.). Acetylene glycol-based surfactants may be used singly or in combination.

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxide compounds. The fluorosurfactant is commercially available, and examples of the commercially available fluorosurfactant include, but are not limited to, S-144 and S-145 (each produced by Asahi Glass Co., Ltd.); FC-170C, FC-430, and Fluorad-FC4430 (each produced by Sumitomo 3M Ltd.); FSO, FSO-100, FSN, FSN-100, and FS-300 (each produced by Dupont); and FT-250 and FT-251 (each produced by Neos Company Limited). Fluorosurfactants may be used singly or in combination.

The silicone surfactant may be a polysiloxane compound or a polyether-modified organosiloxane. The silicone surfactant is commercially available, and examples of the commercially available silicone surfactant include, but are not limited to, BYK-306, BYK-307, BYK-333, BYK-341, BYK-345, BYK-346, BYK-347, BYK-348, and BYK-349 (each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each produced by Shin-Etsu Chemical). Silicone surfactants may be used singly or in combination.

Preferably, the surfactant content in the white ink composition is 0.1% to 5% by mass, more preferably 0.5% to 2% by mass, relative to the total mass of the white ink composition. When the surfactant content is in such a range, the wettability of the white ink composition on the recording medium tends to be increased.

Other Ingredients

To maintain good storage stability and good ejection stability, and also to reduce clogging and prevent deterioration of the ink, the white ink composition of the embodiments may optionally contain other ingredients, such as a solubilizing agent, a viscosity modifier, a pH adjuster, an antioxidant, a preservative, an antifungal agent, a corrosion inhibitor, a chelating agent for capturing metal ions that can affect the dispersion of the pigment, and other additives.

Application of Reaction Liquid

In the step of applying a reaction liquid, a reaction liquid containing a reaction agent is applied onto at least the predetermined region of the recording medium. The reaction agent can increase the viscosity of the white ink composition or aggregate the constituent particles in the white ink composition. The reaction liquid may be applied by, but not limited to, roller coating, spray coating, or an ink jet method. An ink jet method is preferred.

The reaction liquid may be applied at a rate of 0.05 mg/inch$^2$ to 3 mg/inch$^2$, preferably 0.1 mg/inch$^2$ to 2.5 mg/inch$^2$, more preferably 0.5 mg/inch$^2$ to 2 mg/inch$^2$. When the reaction liquid is applied at such a rate, the recording method of the present embodiment tends to produce more advantageous effects.

The surface temperature of the recording medium when the reaction liquid is applied is preferably 45° C. or less, more preferably 10° C. to 40° C., still more preferably 15° C. to 38° C., and further preferably 15° C. to 35° C. When the surface temperature of the recording medium is in such a range, clogging tends to be less likely to occur.

Reaction Liquid

The reaction liquid contains a reaction agent that increases the viscosity of the white ink composition or aggregates the constituent particles in the white ink composition. The reaction agent in the reaction liquid acts on the ink composition to aggregate the constituent particles, thus increasing the viscosity of the ink composition or insolubilizing the ink composition. Consequently, droplets of the ink composition are prevented from interfering with each other when landing, or from bleeding, and thus, high-quality images can be formed. The reaction agent may contain, but not limited to, at least one of a polyvalent metal salt, an organic acid, and any other cationic compound. The reaction agent containing at least one of a polyvalent metal salt, an organic acid, or a cationic compound tends to be able to reduce nonuniformity in solid images and bleeding. The constituent particles that will be aggregated by the reaction agent are, for example, the pigment and the first resin.

Polyvalent Metal Salt

Preferably, the polyvalent metal salt is, but is not limited to, a polyvalent metal salt of an inorganic acid or a polyvalent metal salt of an organic acid. Examples of such a polyvalent metal salt include, but are not limited to, salts of periodic table Group 2 metals or alkaline-earth metals, such as magnesium and calcium, salts of transition metals in periodic table Group 3, such as lanthanum, salts of earth metals in periodic table Group 13, such as aluminum, and salts of Lanthanides, such as neodymium. More specifically, preferred polyvalent metal salts include carboxylates, such as formates, acetates, and benzoates, sulfates, nitrates, chlorides, and thiocyanates. Among these preferred are calcium or magnesium carboxylates, such as format, acetate, and benzoate, calcium or magnesium sulfate, calcium or magnesium nitrate, calcium chloride, magnesium chloride, and calcium or magnesium thiocyanate. These polyvalent metal salts may be used singly or in combination.

Organic Acid

Examples of the organic acid include, but are not limited to, maleic acid, acetic acid, phosphoric acid, oxalic acid, malonic acid, and citric acid. Monovalent or divalent carboxylic acids are preferred. Such a carboxylic acid tends to help the aggregation of the constituent particles in the white ink composition, thus enhancing color developability. Organic acids may be used singly or in combination.

Other Cationic Compounds

Examples of other cationic compounds include cationic surfactants and cationic resins. Exemplary cationic resins include cationic urethane resin, cationic olefin resin, and cationic allyl amine resin. Exemplary cationic surfactants include amine salts and quaternary ammonium salts. These cationic compounds may be used singly or in combination.

The reaction agent content in the reaction liquid is preferably 1% to 10% by mass, more preferably 1.5% to 7.5% by mass, and still more preferably 2.5% to 5% by mass, relative to the total mass of the reaction liquid. When the reaction agent content is in such a range, the image quality of the resulting recorded article tends to be further increased.

The reaction liquid may contain other ingredients as required. Such ingredients are not particularly limited, and, for example, a solvent or a surfactant may be contained.

Solvent

The solvent may be selected from the solvents cited for the white ink composition, but is not particularly limited. Also, the solvent may be the same as or different from the solvent used in the white ink composition.

The reaction liquid may contain water with a content of 40% to 80% by mass, preferably 50% to 70% by mass, relative to the total mass of the reaction liquid.

The reaction liquid may contain an organic solvent with a content of 15% to 35% by mass, preferably 20% to 30% by mass, relative to the total mass of the reaction liquid.

Surfactant

Preferably, the reaction liquid contains a surfactant. The surfactant may be selected from the surfactants cited for the white ink composition, but is not particularly limited. Also, the surfactant may be the same as or different from the surfactant used in the white ink composition.

The surfactant content in the reaction liquid is preferably 0.1% to 5% by mass, more preferably 0.5% to 2% by mass, relative to the total mass of the reaction liquid. When the surfactant content is in such a range, the wettability of the reaction liquid on the recording medium tends to be increased.

Application of Clear Ink Composition

The recording method may further include applying a clear ink composition containing the second resin onto at least the predetermined region of the recording medium, and the application of the white ink composition and the application of the clear ink composition are performed in a state where both the white ink composition and the clear ink composition are wet. Hence, the clear ink composition is applied in what is called a wet-on-wet manner in a state where both the white ink composition and the clear ink composition are wet. Preferably, the clear ink composition is applied with an ink jet recording apparatus. The phrase "the application of the white ink composition and the application of the clear ink composition are performed in a state where both the white ink composition and the clear ink composition are wet" means that both the inks are applied onto the same region by the same pass, or means that each ink composition is applied onto the same region by different passes one after the other in such a manner that the ink composition for the subsequent application is applied in a state where the volatile constituent in the previously applied ink composition remains 40% by mass or more on the recording medium or in such a manner that the subsequent ink application is started onto the recording medium of 40° C. or less within 30 seconds after the completion of the previous ink application. The recording method of this embodiment is advantageous for applying the white ink composition and the clear ink composition in a state where both the ink compositions are wet, and can increase the L* value and opacity of the resulting recorded articles.

The recording method of the disclosure includes an embodiment in which the white ink composition contains both the first resin and the second resin, and an embodiment in which the clear ink composition containing the second resin is used in combination with the first ink composition containing the first resin. Both the embodiments can produce substantially the same effects. In the embodiment of including the application of the clear ink composition, the reaction liquid, the application of the reaction liquid, the first resin, and the second resin are the same as those described above.

In the embodiment of including the application of the clear ink composition, in which the first resin and the second resin are contained in the white ink composition and the clear ink composition, respectively, the resin content in the white ink composition can be reduced. Consequently, the white ink composition can be stably ejected without being hindered by constituent resin with an excessively high content.

The clear ink composition may be applied to the predetermined region at a rate of 0.1 mg/inch$^2$ to 7.5 mg/inch$^2$, preferably 0.5 mg/inch$^2$ to 5 mg/inch$^2$, more preferably 1 mg/inch$^2$ to 3 mg/inch$^2$. When the clear ink composition is applied at such a rate, the image quality, L* value and opacity of the resulting recorded article tend to be further increased.

Clear Ink Composition

The clear ink composition contains the second resin and optionally other ingredients. The clear ink composition used herein is not intended to color the recording medium and is used for other purposes, such as, but not limited to, adjusting the gloss of the recording medium, improving the properties, such as fastness to rubbing, of the recorded articles, and improving the fixability and color developability of color inks. Preferably, the coloring material content in the clear ink composition is 0.1% by mass or less, and more preferably, the clear ink composition does not contain any coloring material.

The second resin content in the clear ink composition is preferably 1% to 12.5% by mass, more preferably 2.5% to 10% by mass, and still more preferably 5% to 7.5% by mass, relative to the total mass of the clear ink composition. When the second resin content is in such a range, the image quality, L* value and opacity of the resulting recorded article tend to be further increased.

When the clear ink composition is used, the ratio of the first resin content in the white ink composition to the second resin content in the clear ink composition is preferably 5:1 to 1:5, more preferably 5:1 to 3:7, and still more preferably 3:2 to 3:7. When the ratio of the first resin content in the white ink composition to the second resin content in the clear ink composition is in such a range, the image quality, L* value and opacity of the resulting recorded article tend to be further increased.

Drying

In the recording method of the embodiment, if the clear ink composition is used after the white ink composition is applied, the ink compositions may be dried at 40° C. or more. For this drying, the drying temperature may be 40° C. or more and is preferably 50° C. or more, more preferably 60° C. or more. The upper limit of the drying temperature may be, but is not limited to, 200° C., preferably 150° C., more preferably 130° C. The drying may be performed by, but not limited to, heating or blowing. The drying helps the production of recorded articles exhibiting high rub fastness or the like.

Recording Medium

The recording medium used in the recording method of an embodiment may be, but is not limited to, an absorbent recording medium, a non-absorbent recording medium, or a poorly absorbent medium. Non-absorbent or poorly absorbent recording media, particularly non-absorbent recording media, are advantageous. The recording medium may be transparent. If an undercoat of the white ink composition is formed on a transparent recording medium, nonuniformity occurs in a solid area of the printed pattern, or ink accumulated at the edge of the pattern seriously affects image quality. The recording method of the present disclosure is advantageous in the case of using a transparent recording medium. The transparent recording medium may be a plastic film as described later or any other non-absorbent recording medium.

A poorly absorbent or a non-absorbent recording medium mentioned herein is such that the recording surface of the medium can absorb water at a rate of 10 mL/m$^2$ or less for a period of 30 ms from the beginning of contact with water when measured by Bristow's method. Bristow's method is broadly used for measuring liquid absorption in a short time, and Japan Technical Association of the Pulp and Paper Industry (JAPAN TAPPI) officially adopts this method. Details of this method are specified in Standard No. 51 of "JAPAN TAPPI Kami Pulp Shiken Hou 2000-nen Ban" (JAPAN TAPPI Pulp and Paper Test Methods, edited in 2000).

Non-absorbent and poorly absorbent media may be classified by the wettability of water on the recording surface thereof. For example, recording media may be characterized by measuring the rate of decrease in contact angle of 0.5 μL of water dropped on the recording surface of each recording medium (comparing the contact angle 0.5 millisecond after landing with the contact angle 5 seconds after landing). More specifically, non-absorbent recording media refer to those exhibiting a contact angle decreasing rate of less than 1%, and poorly absorbent recording media refer to those exhibiting a contact angle decreasing rate in the range of 1% to less than 5%. Absorbent media refer to those exhibiting a contact angle decreasing rate of 5% or more. The contact angle can be measured with, for example, a portable contact angle meter PCA-1 (manufactured by Kyowa Interface Science).

Absorbent recording media include, but are not limited to, plain paper such as electrophotographic paper having high permeability to ink compositions, ink jet paper having an ink absorbing layer containing silica particles or alumina particles or an ink absorbing layer made of a hydrophilic polymer such as polyvinyl alcohol (PVA) or polyvinyl pyrrolidone (PVP), and art paper, coat paper and cast-coated paper that are used for ordinary offset printing and have relatively low permeability to inks.

The poorly absorbent recording medium may be, but is not limited to, coated paper including a coating layer at the surface thereof for receiving oil-based ink. The coated paper may be, but is not limited to, book-printing paper, such as art paper, coat paper, or matte paper.

The non-absorbent recording medium may be, but is not limited to, a plastic film not provided with an ink-absorbing layer, or a paper sheet or any other base material coated with a plastic film. The plastic mentioned here may be polyvinyl chloride, polyethylene terephthalate, polycarbonate, polystyrene, polyurethane, polyethylene, or polypropylene.

The recording medium may be an ink-non-absorbent or poorly ink-absorbent plate made of a metal, such as iron, silver, copper, or aluminum, or glass.

Recording Apparatus

Figure 2:
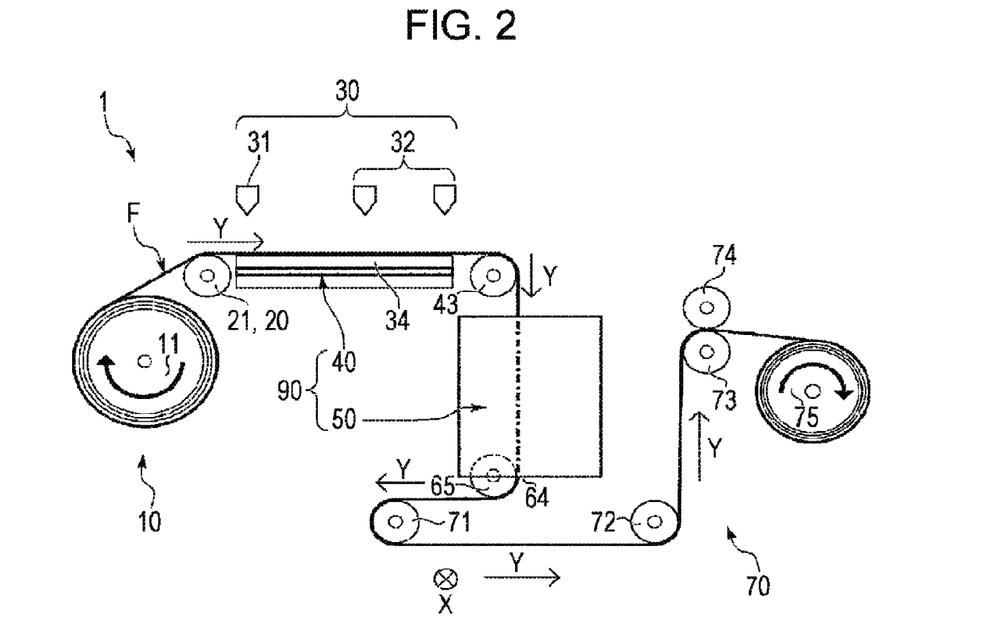
FIG. 2 is a schematic sectional view of an ink jet recording apparatus used in an embodiment of the invention.

The recording apparatus that can be used in the recording method according to an embodiment will now be described. FIG. 2 is a schematic sectional view of an ink jet recording apparatus 1 used in an embodiment of the invention. As shown in FIG. 2, the ink jet recording apparatus 1 includes a recording medium feeder unit 10, a recording medium transport unit 20, a recording section 30, a drying unit 90, and ejection section 70.

The drying unit 90 includes a first dryer 40 that dries the reaction liquid, and a second dryer 50 that dries the recorded article produced by the recording method of the embodiment.

The feeder unit 10 is configured to feed the recording medium F in a roll to the transport unit 20. More specifically, the feeder unit 10 includes a medium roll holder 11, and the medium roll holder 11 holds the recording medium F in a roll. The recording medium F is fed to the transport unit 20 downstream in the Y direction by rotating the roll of the recording medium F.

The transport unit 20 is configured to transport the recording medium F fed from the feeder unit 10 to the recording section 30. More specifically, the transport unit 20 includes a first transport roller 21 that further transports the recording medium F fed thereto to the recording section 30 located downstream therefrom in the Y direction.

The recording section 30 is configured to apply the reaction liquid onto the recording medium F transported from the transport unit 20 and eject the ink composition for recording. More specifically, the recording section 30 includes a head 31 capable of applying the reaction liquid, recording heads 32 each capable of applying the white ink composition or the clear ink composition, and a platen 34 capable of supporting the medium.

The platen 34 is configured to support the recording medium F from the rear side of the medium. The platen 34 is provided with the first dryer 40 that dries the reaction liquid and the ink composition on the recording medium F. In addition, a second transport roller 43 is disposed downstream from the platen 34 in the Y direction. The second transport roller 43 is configured to transport the recording medium F subjected to recording to the second dryer 50 located downstream therefrom in the Y direction.

The second dryer 50 is configured to dry further the reaction liquid and the ink composition on the recording medium F. Furthermore, a third transport roller 65 is disposed near the exit 64 of the second dryer 50. The third transport roller 65 is disposed so as to come in contact with the rear side of the recording medium F and to transport the recording medium F to the ejection section 70 located downstream therefrom in the Y direction.

The ejection section 70 is configured to transport the recording medium F fed from the second dryer 50 further downstream in the Y direction and thus eject the recording medium F from the ink jet recording apparatus 1. More specifically, the ejection section 70 includes a fourth transport roller 71, a fifth transport roller 72, a sixth transport roller 73, a seventh transport roller 74, and a take-up roller 75. The fourth transport roller 71 and the fifth transport roller 72 are disposed so as to come in contact with the surface of the recording medium F. The sixth transport roller 73 and the seventh transport roller are disposed so as to define a roller pair. The recording medium F ejected by the sixth transport roller 73 and the seventh transport roller 74 is wound on the take-up roller 75.

EXAMPLES

The invention will be further described in detail with reference to Examples and Comparative Examples. However, the invention is not limited to the following Examples.
Ingredients of Ink Compositions
The following ingredients were mainly used in the ink compositions of the Examples and Comparative Examples.
Reaction Liquid
Reaction Agents:
   Calcium acetate monohydrate
   Magnesium sulfate heptahydrate
Solvents:
   1,2-Pentanediol
   Dipropylene glycol
   2-Pyrrolidone
Surfactant:
   Silicone surfactant BYK-333 (produced by BYK) White Ink Composition and Clear Ink Composition
Coloring Materials:
   Titanium dioxide having an average particle size of 300 nm
   Titanium dioxide having an average particle size of 150 nm
Resins:
   Polyethylene-based resin fine particles A, AQUACER 507 (produced by BYK, magnitude of increase in average particle size: 15 times)
   Polyester-based water-soluble resin B, Plascoat Z-730 (produced by Goo Chemical, magnitude of increase in average particle size: 11 times)
   Styrene-acrylic resin fine particles C, Mowinyl 972 (produced by Nippon Synthetic Chemical Industry, magnitude of increase in average particle size: 5 times)
   Polyester-based resin fine particles D, Elitel KT-8701 (produced by Unitika, magnitude of increase in average particle size: 2 times)
Solvents:
   1,2-Hexanediol
   Propylene glycol
   2-Pyrrolidone
Surfactant:
   Silicone surfactant BYK-333 (produced by BYK)
Measurement of Magnitude of Increase in Average Particle Size of First Resin and Second Resin The magnitude of increase in average particle size of the first resin and the second resin were measured as below. The liquid of 5% by mass of the first resin in water was first prepared, and the average particle size of the first resin in this liquid was measured by a light scattering method using Microtrac UPA 250 (manufactured by Nikkiso). Subsequently, 0.27 M aqueous solution of magnesium sulfate and the resin-in-water liquid were mixed in a mass ratio of 1:10, and the volume average particle size of the first resin in the mixture was measured by the light scattering method using Microtrac UPA 250. The magnitude of increase in average particle size was calculated from the volume average particle sizes before and after the mixing. The magnitude of increase in average particle size of the second resin was determined in the same manner.
Preparation of Reaction Liquids and Ink Compositions Ingredients were mixed with the proportions shown in Tables 1 to 3 and fully stirred. Each of the reaction liquids and ink compositions was thus prepared.

The values in Tables 1 to 3 are on a percent-by-mass basis, and the total content of each composition is 100.0% by mass.

TABLE 1

| Ink set | Example 1 Reaction liquid | White | Example 2 Reaction liquid | White | Example 3 Reaction liquid | White | Example 4 Reaction liquid | White | Example 5 Reaction liquid | White | Example 6 Reaction liquid | White |
|---|---|---|---|---|---|---|---|---|---|---|---|---|
| Calcium acetate monohydrate | 3.57 | 0 | 3.57 | 0 | 3.57 | 0 | 3.57 | 0 | 3.57 | 0 | 3.57 | 0 |
| Magnesium sulfate heptahydrate | 0 | 0 | 0 | 0 | 0 | 0 | 0 | 0 | 0 | 0 | 0 | 0 |
| Pigment (Titanium dioxide) 300 nm | 0 | 10 | 0 | 10 | 0 | 10 | 0 | 0 | 0 | 10 | 0 | 10 |
| Pigment (Titanium dioxide) 150 nm | 0 | 0 | 0 | 0 | 0 | 0 | 0 | 10 | 0 | 0 | 0 | 0 |
| Polyethylene-based resin fine particles A (Increase: 15 times) | 0 | 1 | 0 | 3 | 0 | 0 | 0 | 3 | 0 | 0 | 0 | 3 |
| Polyester-based water-soluble resin B (Increase: 11 times) | 0 | 0 | 0 | 0 | 0 | 3 | 0 | 0 | 0 | 0 | 0 | 0 |
| Styrene-acrylic resin fine particles C (Increase: 5 times) | 0 | 0 | 0 | 0 | 0 | 0 | 0 | 0 | 0 | 3 | 0 | 0 |
| Polyester-based resin fine | 0 | 4 | 0 | 2 | 0 | 2 | 0 | 2 | 0 | 2 | 0 | 2 |

TABLE 1-continued

|  | Example 1 | | Example 2 | | Example 3 | | Example 4 | | Example 5 | | Example 6 | |
|---|---|---|---|---|---|---|---|---|---|---|---|---|
| Ink set | Reaction liquid | White | Reaction liquid | White | Reaction liquid | White | Reaction liquid | White | Reaction liquid | White | Reaction liquid | White |
| particles D (Increase: 2 times) | | | | | | | | | | | | |
| 1,2-Pentanediol | 4 | 4 | 4 | 4 | 4 | 4 | 4 | 4 | 4 | 4 | 4 | 4 |
| Dipropylene glycol | 15 | 12 | 15 | 12 | 15 | 12 | 15 | 12 | 15 | 12 | 15 | 12 |
| 2-Pyrrolidone | 5 | 5 | 5 | 5 | 5 | 5 | 5 | 5 | 5 | 5 | 5 | 5 |
| Silicone surfactant BYK 333 | 1 | 1 | 1 | 1 | 1 | 1 | 1 | 1 | 1 | 1 | 1 | 1 |
| Water | Balance | Balance | Balance | Balance | Balance | Balance | Balance | Balance | Balance | Balance | Balance | Balance |
| Total | 100 | 100 | 100 | 100 | 100 | 100 | 100 | 100 | 100 | 100 | 100 | 100 |
| Ejection rate (mg/inch$^2$) | 1 | 13 | 1 | 13 | 1 | 13 | 1 | 13 | 1 | 13 | 1 | 8 |
| Primary drying (° C.) | 25 | | 25 | | 25 | | 25 | | 25 | | 25 | |
| Secondary drying (° C.) | 70 | | 70 | | 70 | | 70 | | 70 | | 70 | |
| Image quality | | B | | A | | A | | A | | B | | A |
| L* | | A | | A | | A | | B | | A | | B |
| Opacity | | A | | A | | A | | B | | A | | B |
| Clogging | A | B | A | B | A | B | A | B | A | B | A | B |

TABLE 2

|  | Example 7 | | | Example 8 | | Example 9 | | Example 10 | | Example 11 | | Example 12 | |
|---|---|---|---|---|---|---|---|---|---|---|---|---|---|
| Ink set | Reaction liquid | White | Clear | Reaction liquid | White | Reaction liquid | White | Reaction liquid | White | Reaction liquid | White | Reaction liquid | White |
| Calcium acetate monohydrate | 3.57 | 0 | 0 | 3.57 | 0 | 3.57 | 0 | 3.57 | 0 | 3.57 | 0 | 0 | 0 |
| Magnesium sulfate heptahydrate | 0 | 0 | 0 | 0 | 0 | 0 | 0 | 0 | 0 | 0 | 0 | 3.57 | 0 |
| Pigment (Titanium dioxide) 300 nm | 0 | 10 | 0 | 0 | 10 | 0 | 10 | 0 | 10 | 0 | 10 | 0 | 10 |
| Pigment (Titanium dioxide) 150 nm | 0 | 0 | 0 | 0 | 0 | 0 | 0 | 0 | 0 | 0 | 0 | 0 | 0 |
| Polyethylene-based resin fine particles A (Increase: 15 times) | 0 | 3 | 0 | 0 | 3 | 0 | 1 | 0 | 1 | 0 | 3 | 0 | 1 |
| Polyester-based water-soluble resin B (Increase: 11 times) | 0 | 0 | 0 | 0 | 0 | 0 | 0 | 0 | 0 | 0 | 0 | 0 | 0 |
| Styrene-acrylic resin fine particles C (Increase: 5 times) | 0 | 0 | 0 | 0 | 0 | 0 | 0 | 0 | 0 | 0 | 2 | 0 | 0 |
| Polyester-based resin fine particles D (Increase: 2 times) | 0 | 0 | 7 | 0 | 2 | 0 | 4 | 0 | 4 | 0 | 0 | 0 | 4 |
| 1,2-Pentanediol | 4 | 4 | 4 | 4 | 4 | 4 | 4 | 4 | 4 | 4 | 4 | 4 | 4 |
| Dipropylene glycol | 15 | 12 | 12 | 15 | 12 | 15 | 12 | 15 | 12 | 15 | 12 | 15 | 12 |
| 2-Pyrrolidone | 5 | 5 | 5 | 5 | 5 | 5 | 5 | 5 | 5 | 5 | 5 | 5 | 5 |
| Silicone surfactant BYK 333 | 1 | 1 | 1 | 1 | 1 | 1 | 1 | 1 | 1 | 1 | 1 | 1 | 1 |
| Water | Balance | Balance | Balance | Balance | Balance | Balance | Balance | Balance | Balance | Balance | Balance | Balance | Balance |
| Total | 100 | 100 | 100 | 100 | 100 | 100 | 100 | 100 | 100 | 100 | 100 | 100 | 100 |
| Ejection rate (mg/inch$^2$) | 1 | 13 | 2 | 1 | 13 | 1 | 13 | 1 | 13 | 1 | 13 | 1 | 13 |
| Primary drying (° C.) | 25 | | | 25 | | 35 | | 40 | | 25 | | 25 | |
| Secondary drying (° C.) | 70 | | | 40 | | 70 | | 70 | | 70 | | 70 | |
| Image quality | | A | | | A | | A | | A | | A | | B |
| L* | | A | | | B | | A | | A | | B | | A |
| Opacity | | A | | | B | | A | | A | | B | | A |
| Clogging | A | A | A | A | B | A | B | B | B | A | B | A | B |

TABLE 3

| Ink set | Comparative Example 1 | | Comparative Example 2 | | Comparative Example 3 | | Comparative Example 4 | | Comparative Example 5 | | |
|---|---|---|---|---|---|---|---|---|---|---|---|
| | Reaction liquid | White | Reaction liquid | White | Reaction liquid | White | Reaction liquid | White | Reaction liquid | White | Clear |
| Calcium acetate monohydrate | 3.57 | 0 | 3.57 | 0 | 0 | 0 | 0 | 0 | 3.57 | 0 | 0 |
| Magnesium sulfate heptahydrate | 0 | 0 | 0 | 0 | 0 | 0 | 0 | 0 | 0 | 0 | 0 |
| Pigment (Titanium dioxide) 300 nm | 0 | 10 | 0 | 10 | 0 | 10 | 0 | 10 | 0 | 10 | 0 |
| Pigment (Titanium dioxide) 150 nm | 0 | 0 | 0 | 0 | 0 | 0 | 0 | 0 | 0 | 0 | 0 |
| Polyethylene-based resin fine particles A (Increase: 15 times) | 0 | 0 | 0 | 5 | 0 | 3 | 0 | 3 | 0 | 0 | 3 |
| Polyester-based water-soluble resin B (Increase: 11 times) | 0 | 0 | 0 | 0 | 0 | 0 | 0 | 0 | 0 | 0 | 0 |
| Styrene-acrylic resin fine particles C (Increase: 5 times) | 0 | 0 | 0 | 0 | 0 | 0 | 0 | 0 | 0 | 0 | 0 |
| Polyester-based resin fine particles D (Increase: 2 times) | 0 | 5 | 0 | 0 | 0 | 2 | 0 | 2 | 0 | 7 | 0 |
| 1,2-Pentanediol | 4 | 4 | 4 | 4 | 4 | 4 | 4 | 4 | 4 | 4 | 4 |
| Dipropylene glycol | 15 | 12 | 15 | 12 | 15 | 12 | 15 | 12 | 15 | 12 | 12 |
| 2-Pyrrolidone | 5 | 5 | 5 | 5 | 5 | 5 | 5 | 5 | 5 | 5 | 5 |
| Silicone surfactant BYK 333 | 1 | 1 | 1 | 1 | 1 | 1 | 1 | 1 | 1 | 1 | 1 |
| Water | Balance | Balance | Balance | Balance | Balance | Balance | Balance | Balance | Balance | Balance | Balance |
| Total | 100 | 100 | 100 | 100 | 100 | 100 | 100 | 100 | 100 | 100 | 100 |
| Ejection rate (mg/inch$^2$) | 1 | 13 | 1 | 13 | 1 | 13 | 1 | 13 | 1 | 13 | 2 |
| Primary drying (° C.) | 25 | | 25 | | 25 | | 45 | | 25 | | |
| Secondary drying (° C.) | 70 | | 70 | | 70 | | 70 | | 70 | | |
| Image quality | C | | A | | C | | B | | C | | |
| L* | B | | C | | B | | B | | B | | |
| Opacity | B | | C | | B | | B | | B | | |
| Clogging | A | B | A | B | A | B | B | C | A | A | A |

Recording Method

A recording apparatus provided with a platen heater for the primary heating, modified from PX-G930 (manufactured by Seiko Epson) was used. The reaction and the ink composition, prepared above, were each introduced into the corresponding nozzle line. Then, the reaction liquid was ejected and applied onto a PET film Lumirror S10 (manufactured by Toray). After the recording medium was transported in the reverse direction and set again, the white ink composition was ejected to be applied. In Example and Comparative Example 5, the recording medium was transported in the reverse direction again and set, and then the clear ink was further ejected to be applied. When the clear ink was applied in Example 7 and Comparative Example 5, the white ink composition was wet. Finally, the recording medium ejected from the recording apparatus was subjected to secondary drying for 2 minutes in an oven. Tables 1 to 3 show each ejection rate, the temperature (primary drying temperature) when the reaction liquid and the ink composition were ejected, and the secondary drying temperature after the ink compositions were applied.

Image Quality

Each of the white solid patterns formed as described above was visually observed, and image quality was evaluated according to the criteria described below. When nonuniformity in density occurred or ink was accumulated at the edge of the pattern, it is thought that the amount of ink applied needed to be reduced. The amount of ink applied in such a case is considered to be the limit of the amount of ink applied.

Criteria:

A: There did not occur nonuniformity in density or ink accumulation at the edge.

B: Nonuniformity in density did not occur, but a small ink accumulation at the edge occurred.

C: There occurred both nonuniformity in density and ink accumulation at the edge.

L* Value

The L* value of each white solid pattern formed as described above was measured with a colorimeter Gretag Macbeth Spectrolino (manufactured by X-RITE) with the background thereof black. Evaluation criteria are as follows:

A: L* was 75 or more.

B: L* was 73 to less than 75.

C: L* was less than 73.

Opacity

A fluorescent lamp 3 m away was seen through each of the white solid patterns formed as described above, and opacity was determined depending on how the lamp looked. Evaluation criteria are as follows:

A: The lamp was not visible.

B: The lamp was slightly visible.

C: The lamp was clearly visible.

Clogging

A: There did not occurred nozzle fault or deviation from nozzles even when 50 sheets of A4 paper were printed.

B: Deviation from nozzles occurred when 50 sheets of A4 paper were printed.

C: Nozzle fault occurred when 50 sheets of A4 paper were printed.

As shown in Tables 1 to 3, Examples 1 to 12 were generally better than Comparative Examples 1 to 5 in terms of image quality, L* value, and opacity. According to comparison between Comparative Examples 1 and 2 and the Examples, the case of using only a resin exhibiting a small increase in average particle size resulted in a poorer image quality and a lower L* value and opacity; and the case of using only a resin exhibiting a large increase in average particle size resulted in a lower L* value and opacity. The reaction liquids in Comparative Examples 3 and 4 did not contain a reaction agent, and this is substantially the same as the case of using no reaction liquid. According to comparison between Comparative Examples 3 and 4 and the Examples, the case of using no reaction liquid resulted in a poorer image quality and a lower L* value and opacity; and the case of using no reaction liquid and performing the primary drying at a high temperature resulted in a lower resistance to clogging. According to comparison between Comparative Example 4 and Comparative Example 3, the case of performing primary drying at a lower temperature resulted in a poorer image quality. According to comparison between Comparative Example 5 and the Examples, the case of using a white ink composition containing a resin exhibiting a small increase in average particle size resulted in a poorer image quality and a lower L* value and opacity. According to comparison between Example 7 and the other Examples, the case of using the clear ink composition resulted in an improved clogging resistance.

The entire disclosure of Japanese Patent Application No. 2016-027784 filed Feb. 17, 2016 is expressly incorporated by reference herein.

What is claimed is:

1. A recording method comprising:
    applying a white ink composition containing a white coloring material and a first resin onto at least a predetermined region of a recording medium; and
    applying a reaction liquid containing a reaction agent onto at least the predetermined region of the recording medium, the reaction agent increasing the viscosity of the white ink composition or aggregating constituent particles in the white ink composition,
    wherein the recording method satisfies at least one of the following (i) and (ii):
    (i) the recording method further includes applying a clear ink composition containing a second resin onto at least the predetermined region of the recording medium, wherein the application of the white ink composition and the application of the clear ink composition are performed in a state where both the white ink composition and the clear ink composition are wet; and
    (ii) the white ink composition further contains the second resin,
    wherein when each of a liquid of the first resin in water and a liquid of the second resin in water is mixed with an aqueous solution of magnesium sulfate, the magnitude of increase in average particle size of the first resin is larger than the magnitude of increase in average particle size of the second resin.

2. The recording method according to claim 1, wherein the magnitude of increase in average particle size of the first resin is 3 times or more, and the magnitude of increase in average particle size of the second resin is less than 3 times.

3. The recording method according to claim 1, wherein the first resin and the second resin are each resin fine particles.

4. The recording method according to claim 1, wherein the ink compositions satisfy one of the following:
    the white ink composition contains both the first resin and the second resin, and the ratio of the first resin content to the second resin content is in the range of 5:1 to 1:5 on a mass basis; and
    the ratio of the first resin content in the white ink composition to the second resin content in the clear ink composition is in the range of 5:1 to 1:5 on a mass basis.

5. The recording method according to claim 1, wherein the clear ink composition is applied onto the predetermined region of the recording medium at a rate of 0.5 mg/inch$^2$ to 5 mg/inch$^2$.

6. The recording method according to claim 1, wherein the white coloring material has an average particle size of 200 nm to 400 nm.

7. The recording method according to claim 1, wherein the white ink composition is applied onto the predetermined region of the recording medium at a rate of 10 mg/inch$^2$ to 15 mg/inch$^2$.

8. The recording method according to claim 1, wherein the white ink composition is applied onto the recording medium having a surface temperature of 45° C. or less.

9. The recording method according to claim 1, wherein the recording medium is transparent.

* * * * *